(12) United States Patent
Wells et al.

(10) Patent No.: US 6,182,606 B1
(45) Date of Patent: Feb. 6, 2001

(54) AUTOMATED LIVESTOCK FEEDER

(76) Inventors: John A. Wells, 7280 Hoxie Rd., North Adams, MI (US) 49262; Kevin Cera, 6183 Dodson Pk., Brookville, OH (US) 45309

( * ) Notice: Under 35 U.S.C. 154(b), the term of this patent shall be extended for 0 days.

(21) Appl. No.: 09/221,815

(22) Filed: Dec. 29, 1998

(51) Int. Cl.⁷ .............................. A01K 1/10; A01K 5/00; A01K 39/00
(52) U.S. Cl. ......................................................... 119/51.11
(58) Field of Search .............................. 119/51.03, 51.11, 119/51.13, 56.1, 57.4

(56) References Cited

U.S. PATENT DOCUMENTS

| | | | |
|---|---|---|---|
| 3,352,286 | 11/1967 | Pickelsimer | 119/51.11 |
| 3,376,856 | 4/1968 | Crippen | 119/51.11 |
| 3,543,727 | 12/1970 | Reed | 119/56.1 |
| 3,587,530 | 6/1971 | Blair | 119/51.11 |
| 3,742,913 | 7/1973 | Crippen | 119/51.11 |
| 3,920,224 | 11/1975 | Fassauer | 366/131 |
| 4,183,327 | 1/1980 | Olsen | 119/51.11 |
| 4,235,200 | 11/1980 | Shay | 119/51.11 |
| 4,279,221 | 7/1981 | Arvizu | 119/51.11 |
| 4,337,728 | 7/1982 | Van Gilst et al. | 119/57.4 |
| 4,491,086 | 1/1985 | Croteau | 119/51.11 |
| 4,722,300 | 2/1988 | Walker et al. | 119/51.11 |
| 4,799,455 | 1/1989 | O'Kelly | 119/51.01 |
| 4,922,857 | 5/1990 | Arentoft | 119/51.12 |
| 5,033,412 | 7/1991 | Brennan et al. | 119/72 |
| 5,299,529 | 4/1994 | Ramirez | 119/51.11 |
| 5,782,201 | * 7/1998 | Wells | 119/57.4 |

* cited by examiner

Primary Examiner—Peter M. Poon
Assistant Examiner—Judith A. Nelson
(74) Attorney, Agent, or Firm—Harness, Dickey & Pierce P.L.C.

(57) ABSTRACT

An automated feeding system for feeding livestock in a plurality of pens and a method for using the feeding system. The feeding system includes a plurality of feeders with one feeder in each of a first subset of a plurality of pens. A single controller is used for operation of the feeders and a communication line/cable is provided between the controller and the feeders. The communication line/cable is releasably coupled to each feeder so that the feeders can be used in a first subset of pens after which they are uncoupled from the communication line/cable, moved to a second subset of pens and recoupled to the communication line/cable so that a single controller operates the feeders regardless of which pen they are positioned in.

21 Claims, 2 Drawing Sheets

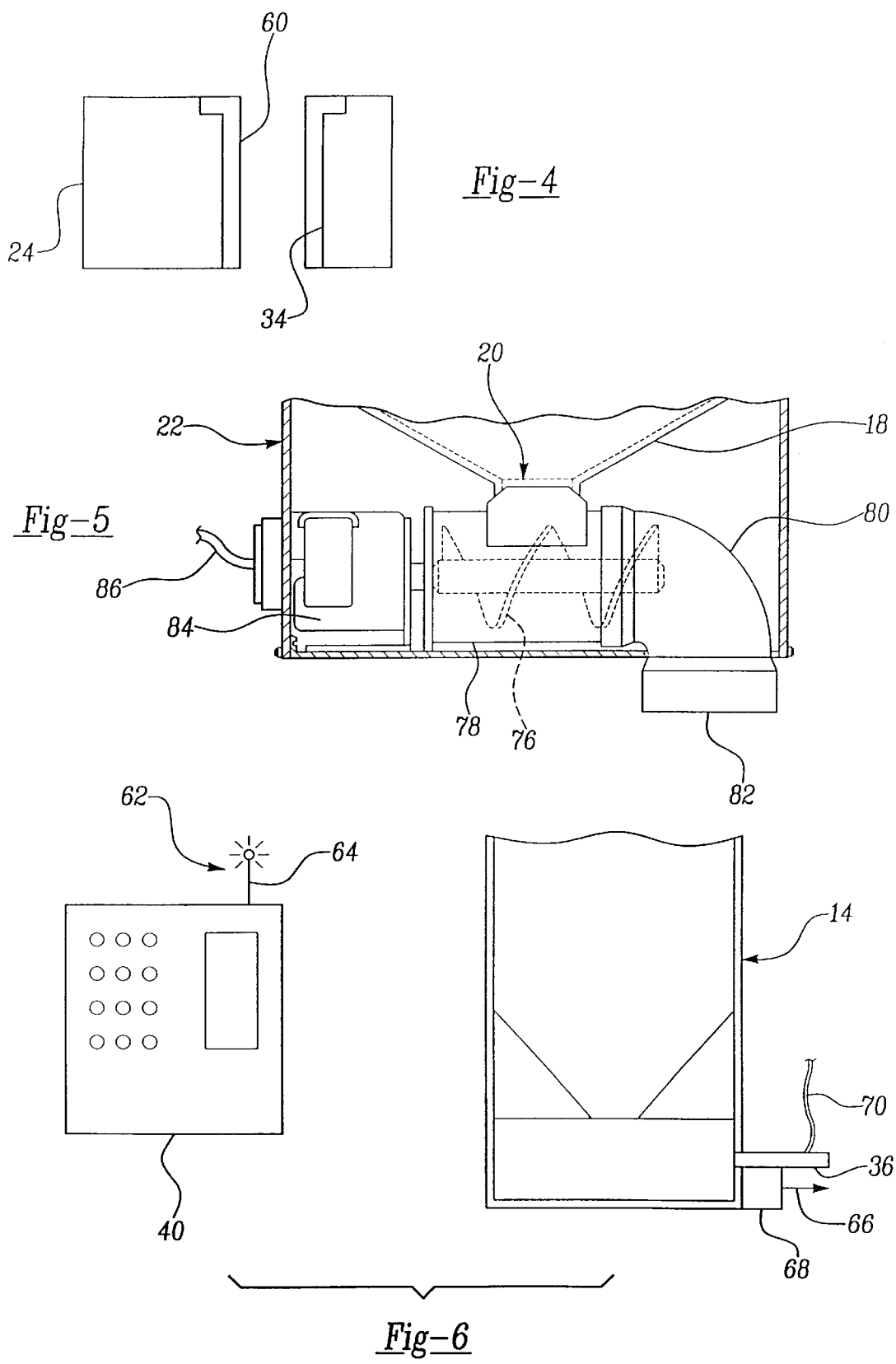

AUTOMATED LIVESTOCK FEEDER

BACKGROUND OF THE INVENTION

The present invention relates to an automated livestock feeding system and method of operation. The system is particularly useful in weaning piglets, however, the invention is not limited to use in weaning livestock but can also be used for regular livestock feeding.

In weaning piglets, farmers often manually distribute a small amount of feed onto the sleeping board in the pens. Labor constraints generally limit the feed distribution to not more than twice per day. The feed is often not measured accurately, resulting in under feeding and less than optimal gains or over feeding with feed becoming soiled and ultimately wasted. The feed fed at this growth stage is expensive, so freshness and controlling waste are critical management requirements. Furthermore, one or two relatively large feedings per day can result in competition with pen mates for the feed, digestive problems resulting from large meals from a new feed source, i.e. dry food as opposed to milk, and depletion of nutrients in the gastro-intestinal track of the animal by long periods without feed.

Accordingly, it is an object of the present invention to provide an automated feeding system that overcomes the above disadvantages of manual feeding.

It is a further object of the present invention to provide a feeding system that overcomes the above disadvantages in a cost effective manner.

It is a further object of the present invention to provide a feeding system that encourages rapid learning of feeding behavior after weaning pigs at early ages.

It is yet another object of the present invention to provide a feeding system that stimulates consumption of dry food as soon as possible after weaning and stimulates increasing rate of consumption each day.

It is still a further object of the present invention to provide a feeding system with easy access to the feed by early weaned pigs without waste or spoilage.

It is yet another object of the present invention to provide a feeding system that delivers frequent, fresh and small meals at planned intervals in an automated manner to stimulate pre-weaning nursing behaviors.

It is still another object of the present invention to provide a feeding system that minimizes labor requirements, management errors and other limitations to provide optimum feeding management of early weaned pigs.

It is a further object of the present invention to provide a feeding system that promotes early, rapid and high rates of feed consumption and weight gain with efficient feed utilization.

SUMMARY OF THE INVENTION

The automated feeding system of the present invention consists of a plurality of feeders, with each feeder in a pen. Each feeder includes a hopper for storing a quantity of feed, a dispenser for dispensing a predetermined quantity of feed from the hopper and an actuator coupled to the dispenser for operating the dispenser to dispense feed. A single programmable controller is provided for controlling the operation of each of the actuators. A communication means is provided for communicating from the controller to each of the actuators to operate the dispensers. The communication means is operable to communicate with the actuators when the feeders are disposed within a first group or subset of pens of a larger plurality of pens. The communication means is also operable to communicate with the feeders when they are moved to a second subset of the plurality of pens. As a result, the feeders can be used within the first subset of pens during a short period of time in which the piglets therein are weaned. After the piglets have been successfully trained to feed from a self-feeder, the feeders of the present invention are moved to a second subset of pens for use in weaning other piglets. The single controller is used for operating the feeders regardless of which pens the feeders are in.

The feeders help the livestock make the transition form nursing to use of a self feeder within the pen. The feeders can also be used with poultry where the poults first feed by scratching the ground or floor. The feed is dropped onto the ground where it will be discovered by the scratching poults. Once the poults have become accustomed to the feed and discover the self feeders in the pens, the feeders of the present invention can be removed.

In a preferred embodiment, the communication means includes a pneumatic system operated by the controller. A pneumatic conduit leads to each pen. A releasable coupling attaches the actuators to the pneumatic conduit to provide the communication from the controller to the actuators. The releasable couplings enable the feeders to be readily moved from one pen to another. Other communication means can be used including a hydraulic system, electrical system with wires or a remote system using ultrasonic or electromagnetic signaling.

Further objects, features and advantages of the invention will become apparent from a consideration of the following description and the appended claims when taken in connection with the accompanying drawings.

BRIEF DESCRIPTION OF THE DRAWINGS

FIG. 4 is a sectional view of one embodiment of the dispenser used with the feeders of the present invention;

FIG. 5 is a sectional view of an alternative embodiment of the dispenser; and

FIG. 6 is a schematic view of the feeding system with a remote communication means between the controller and the actuators for remote actuation.

DETAILED DESCRIPTION OF THE PREFERRED EMBODIMENT

Figure 1:
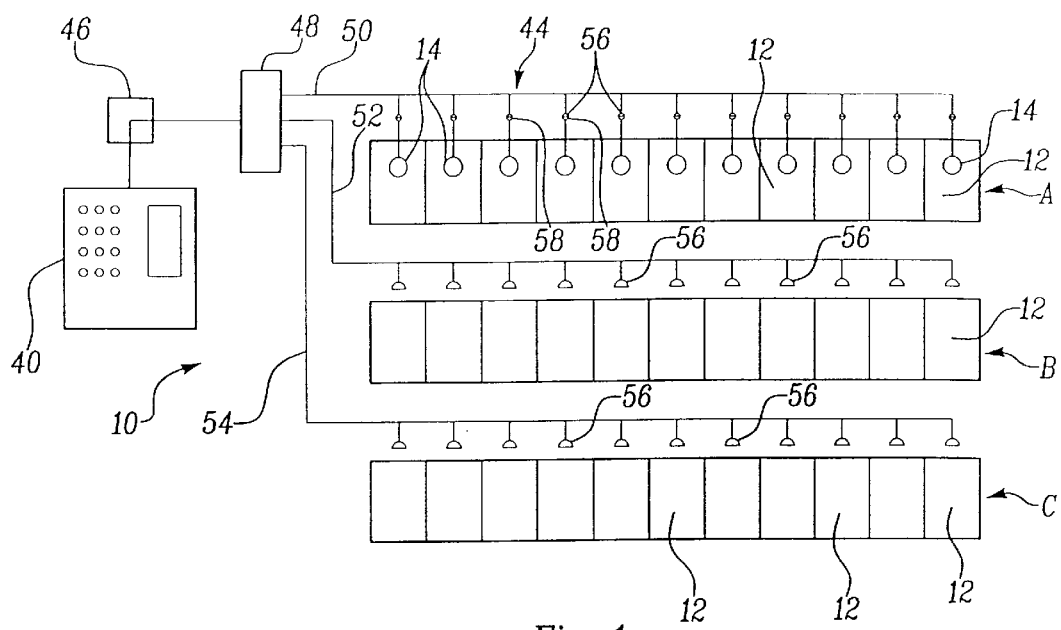
FIG. 1 is a schematic diagram of the feeding system of the present invention.

The automated feeding system of the present invention is shown in FIG. 1 and designated generally at 10. The feeding system 10 is used to control the delivery of feed to a plurality of pens 12 containing livestock. The pens 12 are shown in FIG. 1 in three rows designated as A, B and C. Row A represents a first subset of pens among the plurality of pens 12 shown. Likewise, rows B and C represent second and third subsets of the plurality of pens 12. As shown in FIG. 1, the pens 12 in the subset A have feeders 14 therein. The feeders 14 are shown in greater detail in FIGS. 2 and 3. The feeders 14 each include a hopper 16 for storing a plurality of feed therein. The hoppers 16 may be formed with a conical lower end 18, at the lower end of each hopper. An outlet opening 20 is provided at the lower end of the hopper.

Figure 2:
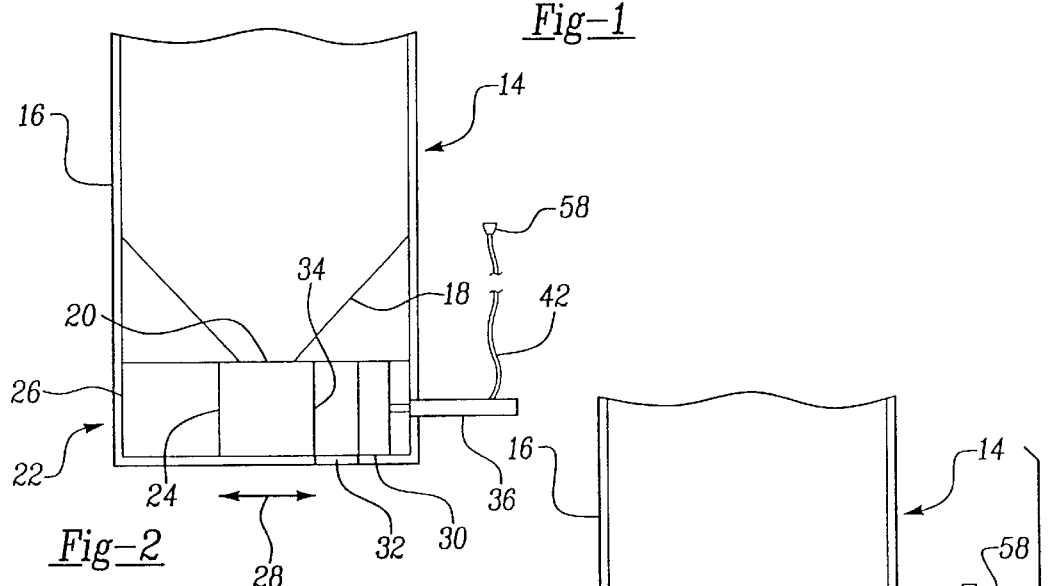
FIGS. 2 and 3 are vertical sectional views of the feeders used in the automated feeding system of the present invention.
Figure 3:
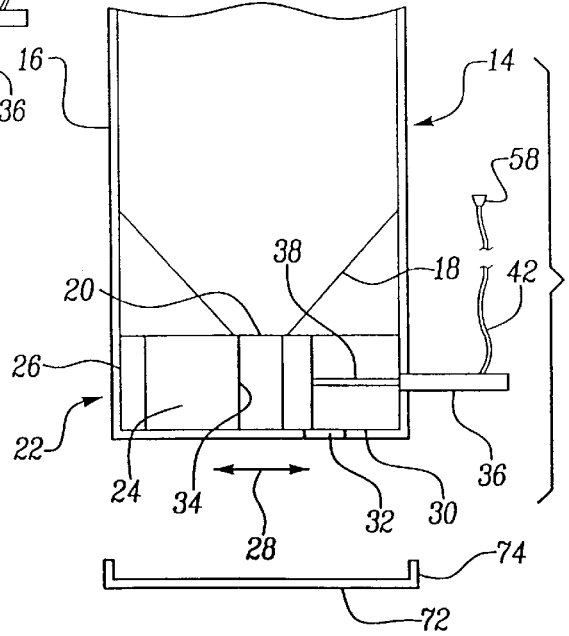

Below each hopper 16 is a dispenser 22 that is operable to dispense a predetermined quantity of feed. As shown in FIGS. 2 and 3, the dispenser is in the form of a slide block 24 that is mounted by a frame 26 for sliding motion as shown by the arrows 28. The frame 28 has a lower plate 30 with a feed drop aperture 32 therein which is laterally spaced relative to the hopper outlet opening 20. The slide block 24 includes a vertically extending through bore 34. The slide block is movable between one position shown in FIG. 2 in which the through bore 34 is aligned with the feed discharge aperture 32 and a second position shown in FIG. 3 in which the through bore 34 is aligned with the outlet opening 20 of the hopper. In the second position, feed is allowed to flow into the slide block from the hopper 16. When the slide block 24 is moved back to the first position, shown in FIG. 2, the feed is allowed to drop through the discharge aperture 32 into the associated pen 12. Each feeder includes an actuator 36 to move the slide block back and forth as shown by the arrow 28 and described further below.

The feed system further includes a single controller 40 for controlling the operation of each of the actuators 36. In a preferred embodiment, the actuators 36 are pneumatic cylinders having a rod 38 coupled to the slide blocks. Each actuator includes a pneumatic hose 42 through which the actuator is coupled to the controller 40. A communication system 44 couples the actuators 36 to the control system 40. The communication system 44 includes a pneumatic power supply 46 operated by the controller 40. The pneumatic power supply 46 is coupled to a manifold 48. The manifold 48 is in turn connected to multiple pneumatic supply lines 50, 52, 54 which are directed to the subsets A, B and C of the pens 12, respectively. Each of the pneumatic supply lines terminates with a coupling half 56 at each of the pens 12. A complementary coupling half 58 is provided on each of the pneumatic hoses 42 of the actuators 36. The coupling halves 56, 58 are releasable, enabling the actuators 36 to be released from the pneumatic line 50 once the piglets in the subset A of the pens 12 have become accustomed to self feeders without the pens. The feeders 14 are then moved to subset B or C of pens to deliver feed to piglets in those pens. The actuators 36 are then coupled to the pneumatic line 52 or 54 to provide communication from the controller to the feeders 14.

The controller 40 is a programmable controller which is used to provide frequent fresh small meals at planned intervals throughout the day and night. By automatically controlling the dispensers to deliver feed, labor requirements are minimized while frequent, small meals are provided. The frequent presentation of feed encourages the pig to adapt from nursing as a group to feeding as a group. The feed is dropped where the pigs are resting which allows the pigs to "discover" the feed by walking on the feed tray and "routing" in the feed. Since the feed is delivered in small quantities at frequent intervals, the gastro-intestinal track of the animals is not emptied for long periods of time. Furthermore, large amounts of feed are not consumed at any one time thereby avoiding digestive problems that can result from consuming large amounts of feed. Since a small quantity of feed is delivered during a feeding cycle, the feed is consumed quickly, thereby avoiding the problem of feed waste and soiled feed.

The quantity of feed delivered at any given feeding cycle can be varied over the time period the feeders are used in a given pen. One way to vary the feed quantity is to vary the number of times the actuators 36 are operated during each feeding cycle. For instance, if it is desired to increase the quantity of feed delivered, the actuators can be operated twice, as opposed to once, to double the quantity of feed delivered. Another manner of varying the quantity of feed delivered is to provide removable sleeves 60 that can be positioned within the through bore 34 of the slide blocks 24, see FIG. 4. The internal volume of the through bore 34, available for dispensing feed, can be varied by the wall thickness of the sleeves. Multiple sleeves, each being a different wall thickness, can be used to give the farmer flexibility in the feed quantity dispensed.

Other types of actuators can be used besides the pneumatic cylinders shown and described above. Alternatives include hydraulic cylinders with a hydraulic power supply or electric motors or solenoids with an electric power supply.

The dispenser is not limited to a slide block as shown in FIGS. 2, 3 and 4. An auger 76 can be used as shown in FIG. 5. The auger 76 is positioned horizontally in a tube 78 beneath the outlet opening 20 at the bottom of the hopper 16. The tube 78 is open to receive feed from the hopper. The tube 78 has a right angle bend 80 leading to a feed discharge opening 82. An electric motor 84 rotates the auger 76 to cause feed to move from the hopper to the discharge aperture 82 and into the pen 12. The motor 84 can be connected by an electrical wire 86 to an electric power source regulated by the controller 40. Alternatively, the wires 86 can be directly connected to a building electrical supply and a radio frequency or other remote switching means used to communicate from the controller 40 to operate the motor 84. A remote communication system can also be used with the slide blocks 24 using an electric motor or solenoid for the actuator.

As shown in connection with FIG. 6, a communication system 62 is provided between the controller 40 and the actuators 36 which is remote and does not require a mechanical/physical coupling to the controller. In this embodiment, the communication system 62 utilizes a remote actuation means such as radio frequency to operate the actuators 36. An antenna 64 is provided on the controller which transmits an RF signal that is received by an antenna 66 at each feeder 14. A receiver 68 is coupled to the actuator 36 to cause the operation of the actuator 36. A separate power line 70, such as an electrical wire, may be required which is connected through a standard outlet to a building electrical system to provide power to the actuator 36. In addition to radio frequency actuation, other remote means can be used including other electromagnetic frequencies or ultrasonic signaling.

The feeders 14 are disposed within the pens 12 over a feed tray 72 (FIG. 3) on the floor of the pen 12. The feed tray 72 may have raised side walls 74 to help contain the feed thereon. The feed tray 72 is also beneficial in that it provides a draft free area for the pigs to rest upon, away from the slotted floor of the pen. A heat lamp can also be provided above the tray 72 to encourage the pigs to congregate on the tray. This results in the pigs being nearby when the feed is dropped to gain their attention. The feeders 14 can be suspended from the ceiling or supported upon legs in each pen.

The manifold 48 may include one or more valves to control the distribution of the pneumatic, or other, power to the individual feeders. Additionally, more than one manifold may be employed depending on the number of subsets of pens utilized with a single controller and the number of feeders utilized.

Typically, the controller will operate all of the actuators at the same time for a feeding cycle. With a more complex communication means and controller, the feeders 14 can be separately connected to the controller for individual operation of the actuators 36. Alternatively, a portion of the actuators 36 can be operated at a single time.

When used to feed piglets, the feeders will be placed in the pen before the piglets arrive. The piglets will be fed by the automated feeding system for approximately 7 to 10 days as they learn to feed from a self-feeder (not shown) permanently installed in the pens. When this critical early feeding period is completed, the feeders are removed from the pens and cleaned for use within other pens. The tray 72 is independent from the feeder so that it may be left in the pens 12 for a longer period of time to be used as a resting area for the piglets.

The controller 40 is programmed based on a variety of factors including: a) weaning weight and age of the piglets; b) the number of piglets per pen; c) feeding cycles per 24 hours; and d) the number of days the piglets are in the pen, i.e. increasing the feed consumption. The quantity of feed dispensed during a feeding cycle is controlled as described above.

The automated feeding system of the present invention will challenge the piglets to consume the optimum amount of feed for rapid efficient weight gain with minimal waste of feed. In addition, labor problems are solved in the feeding of the piglets as presented by frequent small quantities of feed to the piglets.

It is to be understood that the invention is not limited to the exact construction illustrated and described above, but that various changes and modifications may be made without departing from the spirit and scope of the invention as defined in the following claims.

What is claimed is:

1. An automated feeding system for feeding livestock in a plurality of pens, said system comprising:
    a plurality of feeders, with one feeder in each of a first subset of said plurality of pens, each feeder including a hopper with an outlet opening at a lower end thereof, a dispenser coupled to said hopper at the lower end thereof beneath said outlet opening for dispensing a predetermined quantity of feed from said hopper, and an actuator coupled to said dispenser for actuating said dispenser to dispense feed;
    a single programmable controller for controlling the operation of said actuators; and
    communication means for communication from said controller to said actuators to operate said dispensers, said communicating means being operable to communicate with said actuators when said feeders are in said first subset of said plurality of pens and also when said feeders are in a second subset of said pens whereby said feeders can be used with said first subset of pens and then moved to said second subset of said pens and controlled by said single controller for operation of said actuators.

2. The automated feeding system as defined by claim 1 wherein said communication means comprises a pneumatic conduit and a releasable coupling half on said pneumatic conduit at each of said plurality of pens to connect said pneumatic conduit to said actuators.

3. The automated feeding system as defined by claim 2 wherein said communication means includes at least one manifold.

4. The automated feeding system as defined by claim 1 wherein said communication means comprises a hydraulic conduit and a releasable coupling half on said hydraulic conduit at each of said plurality of pens to connect said hydraulic conduit to said actuators.

5. The automated feeding system as defined by claim 4 wherein said communication means includes at least one manifold.

6. The automated feeding system as defined by claim 1 wherein said communication means comprises an electric wire and a releasable coupling half on said electric wire at each of said plurality of pens to connect said electric wire to said actuators.

7. The automated feeding system as defined by claim 6 wherein said actuators include an electric solenoid.

8. The automated feeding system as defined by claim 6 wherein said actuators include an electric motor.

9. The automated feeding system as defined by claim 1 wherein said communication means comprises an electromagnetic signal transmitter and said actuators include an electromagnetic signal receiver.

10. The automated feeding system as defined by claim 1 wherein said dispenser includes a slide block with a vertical bore therethrough movable by said actuator between two positions.

11. The automated feeding system as defined by claim 10 further comprising a cylinder positionable within said bore to reduce the internal volume thereof.

12. The automated feeding system as defined by claim 1 wherein said dispenser includes an auger.

13. The automated feeding system as defined by claim 12 wherein said actuator includes an electric motor.

14. The automated feeding system as defined by claim 1 further comprising a feeding tray in each pen positioned below said dispenser and upon which feed is dropped.

15. The automated feeding system as defined by claim 14 wherein said feeding tray has upright side walls to retain feed thereon.

16. A method of feeding livestock confined within a plurality of pens, said method comprising the steps of:
    providing a feeder for each pen of a first subset of said pens, each said feeder including a hopper with an outlet opening at a lower end thereof, a dispenser coupled to said hopper beneath said outlet opening for dispensing a predetermined quantity of feed from said hopper, and an actuator coupled to said dispenser for actuating said dispenser to dispense feed;
    providing a single programmable controller for controlling the operation of said actuators;
    providing communication means for communication from said controller to said actuators to actuate said dispensers, said communicating means being operable to communicate with said actuators when said feeders are in said first subset of said pens and also when said feeders are in a second subset of said pens;
    programming said controller for periodic feeding cycles in which said controller operates said actuators to dispense a predetermined quantity of feed into each pen of said first subset of said pens over a given time period; and
    after said given time period, moving said feeders from said first subset of said pens to said second subset of said pens to feed livestock therein.

17. The method as defined by claim 16 further comprising the step of varying the quantity of feed dispensed during each feeding cycle over said given time period.

18. The method as defined by claim 17 wherein said step of varying the quantity of feed dispensed during each feeding cycle is accomplished by changing the quantity of feed that is dispensed with each actuation of said dispensers.

19. The method as defined by claim 17 wherein said step of varying the quantity of feed dispensed during each feeding cycle is accomplished by changing the number of times said actuators are operated during each of said feeding cycles.

20. The method as defined by claim 16 further comprising the step of programming said controller to operate only a portion of said actuators at a given time.

21. The method as defined by claim 16 wherein said actuators are connected to said communication means by releasable couplings and wherein said step of moving said feeders includes uncoupling said actuators from said communication means at said first subset of pens and recoupling said actuators to said communication means at said second subset of pens.

* * * * *